United States Patent [19]
Van Cleave

[11] 3,955,456

[45] May 11, 1976

[54] PORTABLE SAW TABLE

[75] Inventor: Eugene H. Van Cleave, Orchard Lake, Mich.

[73] Assignee: Van Mark Products Company, Farmington Hills, Mich.

[22] Filed: Sept. 9, 1974

[21] Appl. No.: 504,044

[52] U.S. Cl. ............................. 83/471.3; 83/486.1
[51] Int. Cl.² ........................ B27B 5/20; B27B 9/04
[58] Field of Search .......... 83/467, 473, 477, 471.1, 83/471.3, 471.2, 486.1

[56] References Cited
UNITED STATES PATENTS

| | | | |
|---|---|---|---|
| 2,990,862 | 7/1961 | Ruben | 83/477 X |
| 3,295,568 | 1/1967 | Cassey | 83/471.3 |
| 3,628,578 | 12/1971 | Berg | 83/471.3 |
| 3,872,755 | 3/1975 | Marsh et al. | 83/471.3 |

*Primary Examiner*—Willie G. Abercrombie
*Attorney, Agent, or Firm*—Cullen, Settle, Sloman & Cantor

[57] ABSTRACT

A portable saw table of extensible working length for cutting workpieces at various angles relative to the longitudinal axis of the workpiece, including an elongated main deck having an upper support surface and a boom support element projecting upwardly from said support surface. The main deck has front and rear parallel longitudinal edges, and at least one elongated top deck telescopically engages the parallel longitudinal edges of the main deck, this top deck having an upper work supporting surface above the upper support surface of the main deck. A saw supporting boom is pivotally mounted on the boom support element, the boom having a work-supporting surface supported at the level of the work-supporting surface of the top deck by integral downwardly depending flanges contacting the main deck.

20 Claims, 9 Drawing Figures

PORTABLE SAW TABLE

BACKGROUND OF THE INVENTION

This invention relates to work tables in general, and, more particularly, to an improved portable saw table of adjustable working length for cutting workpieces at various angles relative to their longitudinal axes.

A saw table comprises, in general, a work-supporting surface and a saw-supporting boom. Moving a saw along the boom causes the saw to cut through the workpiece.

Various problems have been encountered with prior saw tables. For example, saw tables are typically of a fixed length with any extensions being hinged thereto such as in the form of a drop leaf. These prior tables are not adjustable to the exact length of the workpiece, resulting in a less convenient table.

A second problem arises from the vertical height relationship of the saw table and the saw supporting boom. The prior tables provide a work-supporting surface which is often nicked or marred by the teeth of a saw during the cutting of the workpieces.

Yet a third type of problem with the prior tables is a lack of sufficient support for the workpiece both at its extremities and at the area where the workpiece is being cut. Attempts to properly support the workpiece in the area where the workpiece is being cut increases the aforementioned problem of nicking or damaging the support surface with the saw blade.

A fourth problem in the prior tables is the failure to provide a table wherein the saw-supporting boom is adjustable to accept saws of different sizes and to further provide a boom which may be conveniently removed for storage.

SUMMARY OF THE INVENTION

The present invention provides a new and improved saw table which eliminates the various problems referred to above.

It is an object of the present invention to provide an improved saw table which is of adjustable working length and which provides support for the workpiece at the ends thereof and in the area where the workpiece is being cut.

It is another object of the present invention to provide an improved saw table having a removable boom adjustable in width to receive different size saws and which may be locked to the table in a plurality of positions for both straight and angular cutting of the workpiece.

It is yet another object of the present invention to provide support for a workpiece in the area where the workpiece is being cut while eliminating nicking or marring of the workpiece support surface.

BRIEF DESCRIPTION OF THE DRAWINGS

The foregoing objects of the present invention, together with other objects and advantages attained by its use, will become more readily apparent upon reading the following detailed description of the invention, taken in conjunction with the drawings.

In the drawings, wherein like reference numerals identify corresponding elements.

DETAILED DESCRIPTION OF THE INVENTION

As shown in the drawings, the present invention includes a portable extendable saw table 10 including an elongated main deck 11 having an upper support surface 12. The main deck 11, which is stationary, may be formed as a single extrusion and includes a plurality of grooves 13 in the upper surface 12. The grooves contain inserts 14 of low friction material such as polyvinyl chloride or the like to facilitate relative motion between the main deck 11 and other parts of the saw table hereinafter described.

The main deck 11 includes front and rear parallel longitudinal edges 15 and 16, respectively, and a plurality of downwardly projecting ribs 17.

Secured to the main deck 11 and projecting vertically upward from the upper surface 12 thereof is a cylindrical post or boom support member 20. In a preferred embodiment, this post is medially positioned relative to the main deck upper surface 12. However, it should be appreciated that without departing from the spirit and scope of the present invention, the post 20 may extend upwardly from a different portion of the upper surface 12 of the main deck.

The saw table further includes at least one upper deck 25 telescopically mounted on the main deck 11. In the drawings, two such upper decks 25 and 26 are shown. Each deck includes an upper work support plate 27 positioned vertically above the upper surface 12 of the main deck 11 and substantially laterally coextensive therewith.

Each upper deck is formed as an elongated extrusion having front and rear depending longitudinal flanges 28, each having inturned lower horizontal portions 29. The upper plate 27, the flanges 28 and the portions 29 each cooperate to provide longitudinal guide channels 30 coextensive with the upper deck and directly underlying the upper plate 27. A lower integral flange 31 projecting from each of the flanges 28 and projecting inwardly as at 32 underlies the edges 15, 16 of the main deck 11 and prevents vertical displacement of the upper deck 25 from the main deck 11.

Each upper deck is mounted on the main deck with the front and rear edges 15, 16 of the main deck entrapped between the portions 29 and the projections 32 of the upper deck. Fastening means are provided to secure each upper deck to the lower deck in any one of a number of telescopically adjusted positions. Specifically, there is illustrated a screw 36 threaded through one of the flanges 31 to frictionally engage the front edge 15 of the main deck 11.

An upward projection 33 from the flange 31 cooperates with a downward projection 34 from the upper plate 27 to provide a guide channel 35 along each longitudinal edge of each upper deck 25 for a purpose hereinafter explained in detail.

Figure 3:
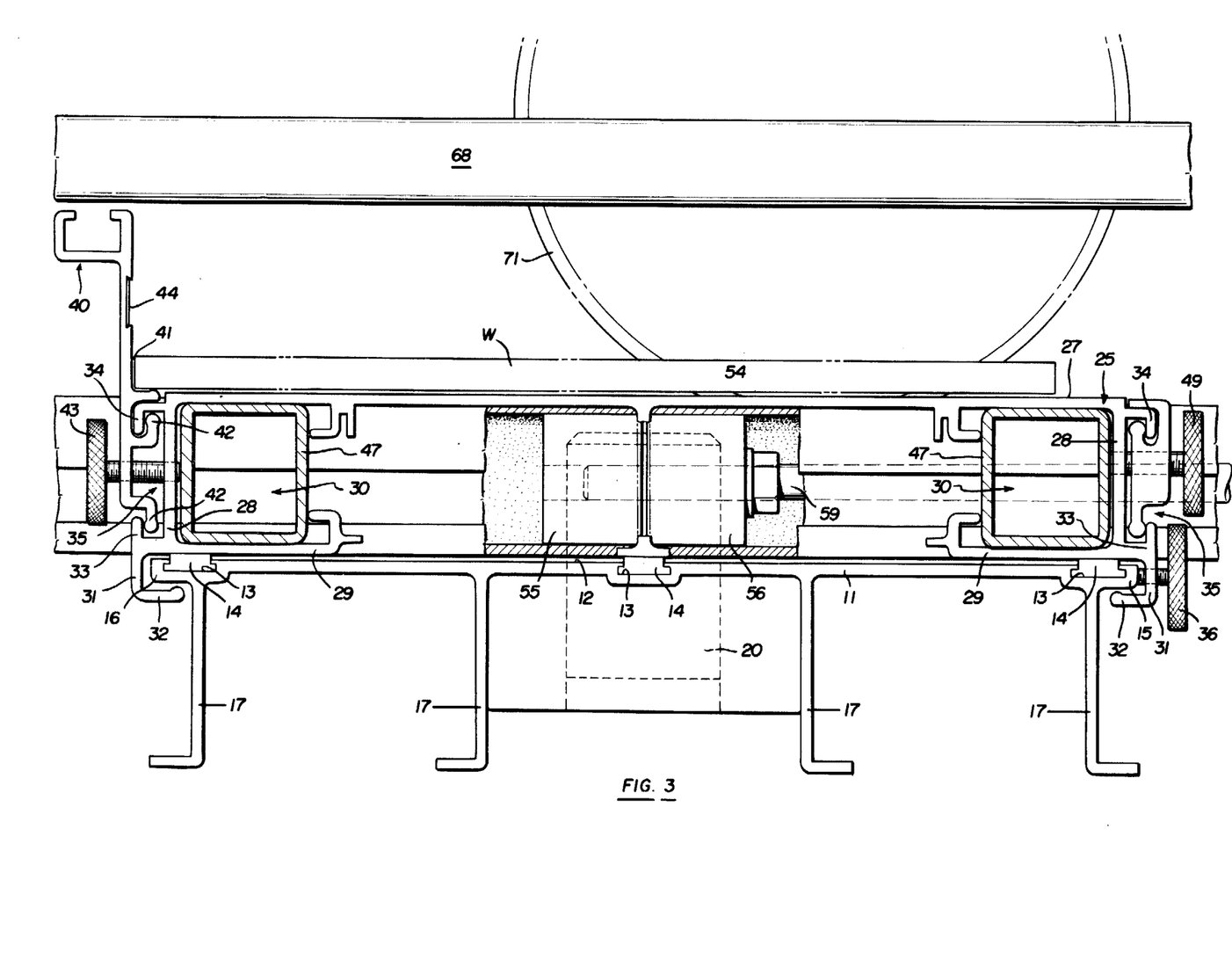
FIG. 3 is a sectional view taken along the plane 3—3 of FIG. 1.
Figure 9:
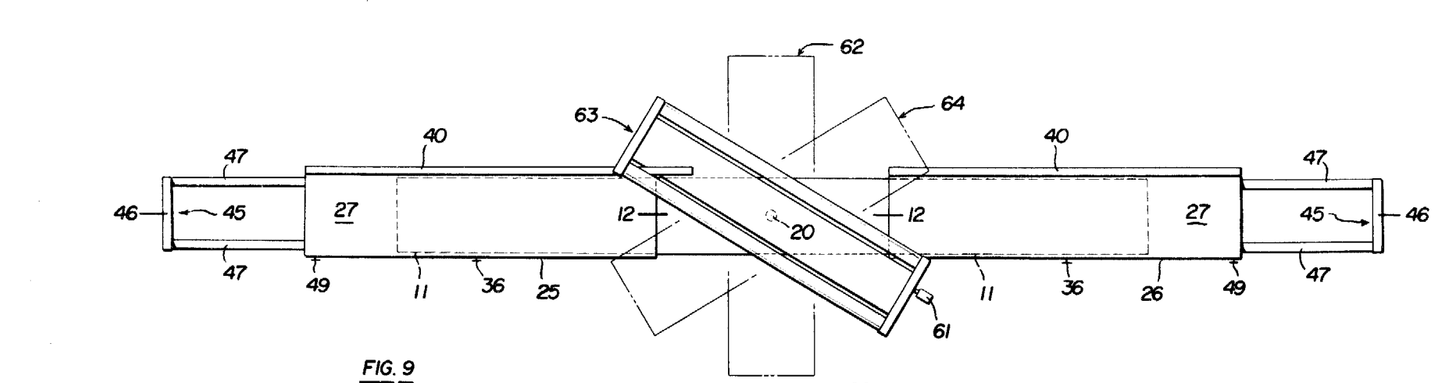
FIG. 9 is another top plan view of the present invention illustrating pivotal movement of the boom.

Each upper deck is mounted on the main deck and independently telescopically movable with the main deck forming a guide and support for the upper deck as illustrated in FIGS. 3 and 9. The upper surface of the support plate 27 of each upper deck is vertically above the top of the post or boom support element 20 for supporting a workpiece W vertically above the post (FIG. 3).

Slidably mounted in the rear channel 35 of each upper deck is a guide rail 40 having a vertical guide surface 41 projecting above the plate 25. The rail has integral flanges 42 slidably engaged in the channel 35. Fastening means such as a screw 43 is threaded through the guide rail to engage the deck flange 28, thereby retaining the guide rail 40 in position. The guide surface 41 may carry a scale or other indicia of length 44 for measuring the length of the workpiece to be cut.

Figure 4:
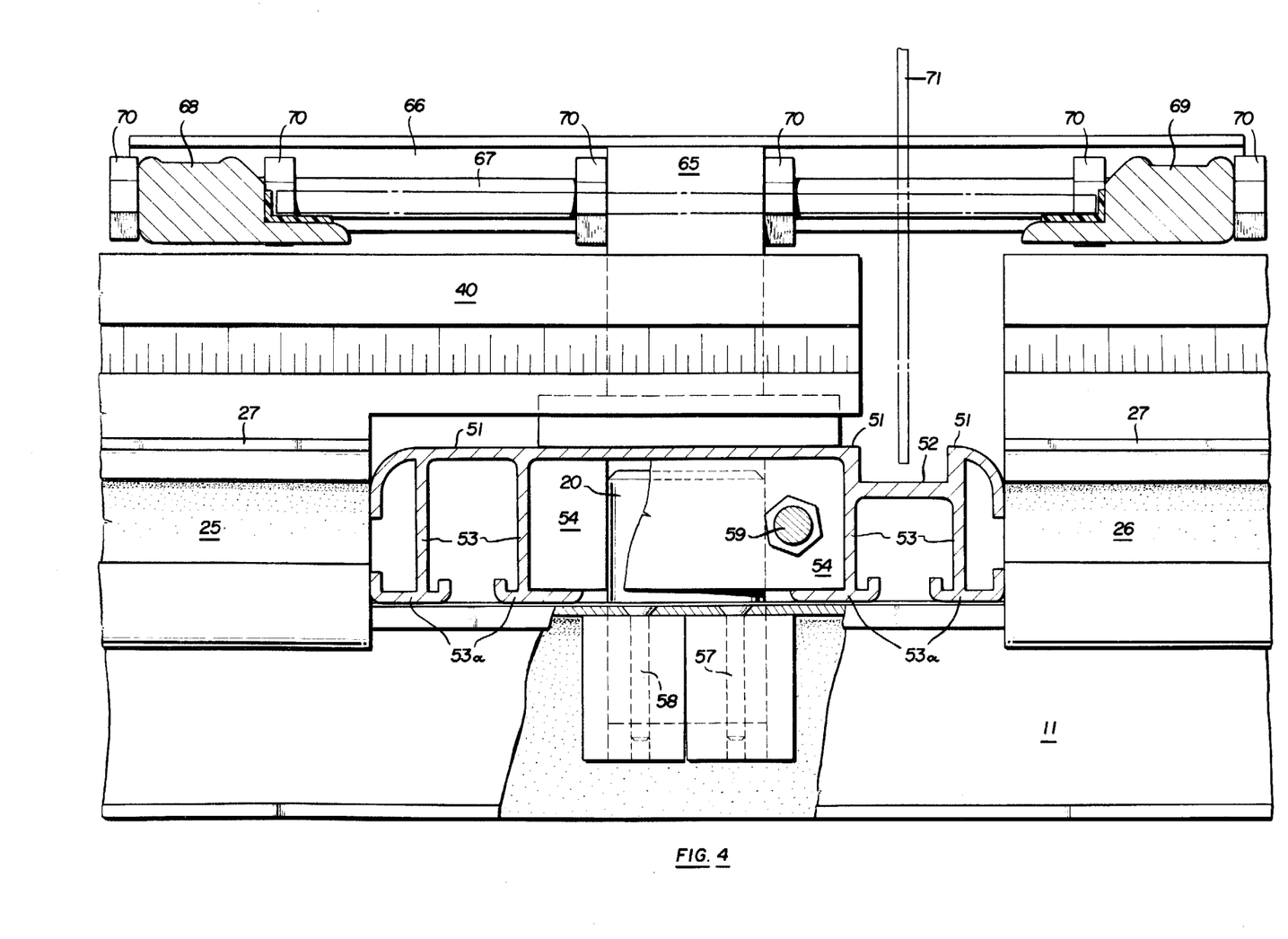
FIG. 4 is a sectional view taken along the plane 4—4 of FIG. 1.

With reference to FIGS. 4 and 9, it should be noted that each top deck telescopes inwardly into an abutting relationship with the boom support element 20 but does not telescope inwardly beyond such element. Thus, the two top decks do not contact each other. However, the guide surface 41 of the rail 40 mounted to top deck 25 extends inwardly beyond top deck 25 to abut the guide rail associated with top deck 26. In this manner continuous rear support and measuring capabilities are provided.

To further extend the working length of the saw table of the present invention, there are provided a plurality of C-shaped extensions 45 each having a base 46 and opposed parallel legs 47. The legs fit into the longitudinal guide channels 30 of the upper deck, as illustrated in greater detail in FIG. 3. To provide support for the workpiece at the appropriate vertical height relative to the main deck, the base 46 is greater in vertical dimension than the legs 47, so that the top 48 of the base 46 is in substantially the same horizontal plane as the upper work surface 27 of the upper deck. Each C-shaped extension is adjustably secured within its channel 30 by a fastening means, such as a threaded screw and clip arrangement 49. The clip is slidably mounted in the front guide channel 35, and the screw extends through the clip and the flange 28 to frictionally engage the adjacent leg 47 of the extension in the channel 35.

Figure 8:
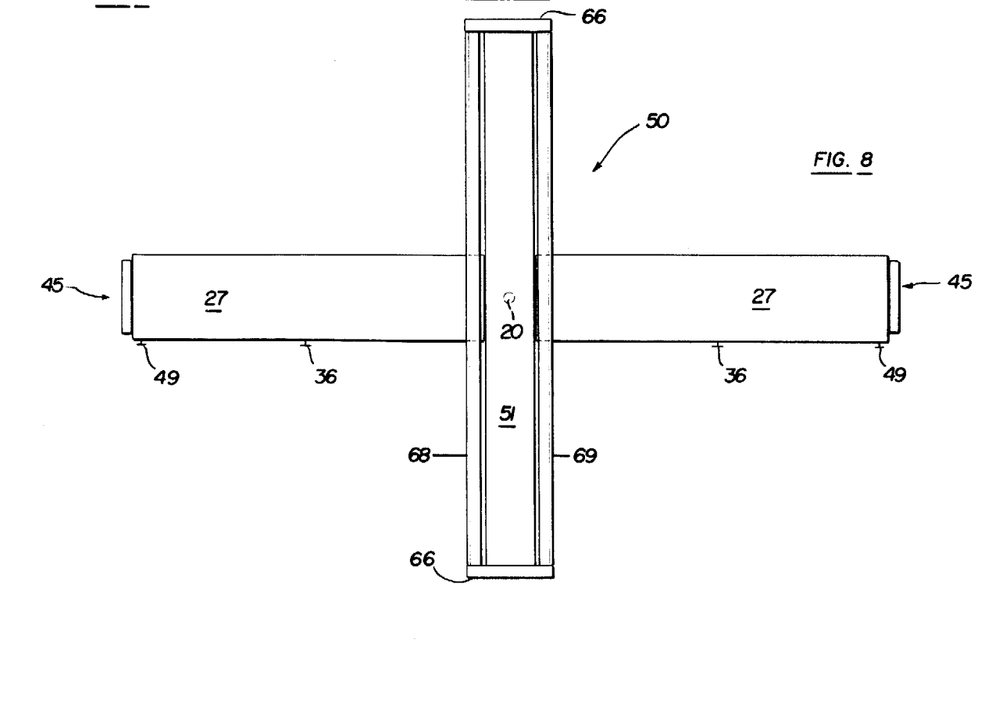
FIG. 8 is a top plan view of the saw table of the present invention.

With the C-shaped extensions and upper decks each telescoped inwardly towards the boom support post 20, the overall length of the saw table of the present invention is about eight feet. With the C-shaped extensions and upper deck all telescoped outwardly, the maximum amount, the overall length of the table is eighteen feet. At this fully extended position a workpiece is fully supported at its ends and along the intermediate portions of the workpiece with all the support being in the same plane. Furthermore, the slidable guide rails 40 may be removed if desired as illustrated in FIG. 8.

Figure 1:
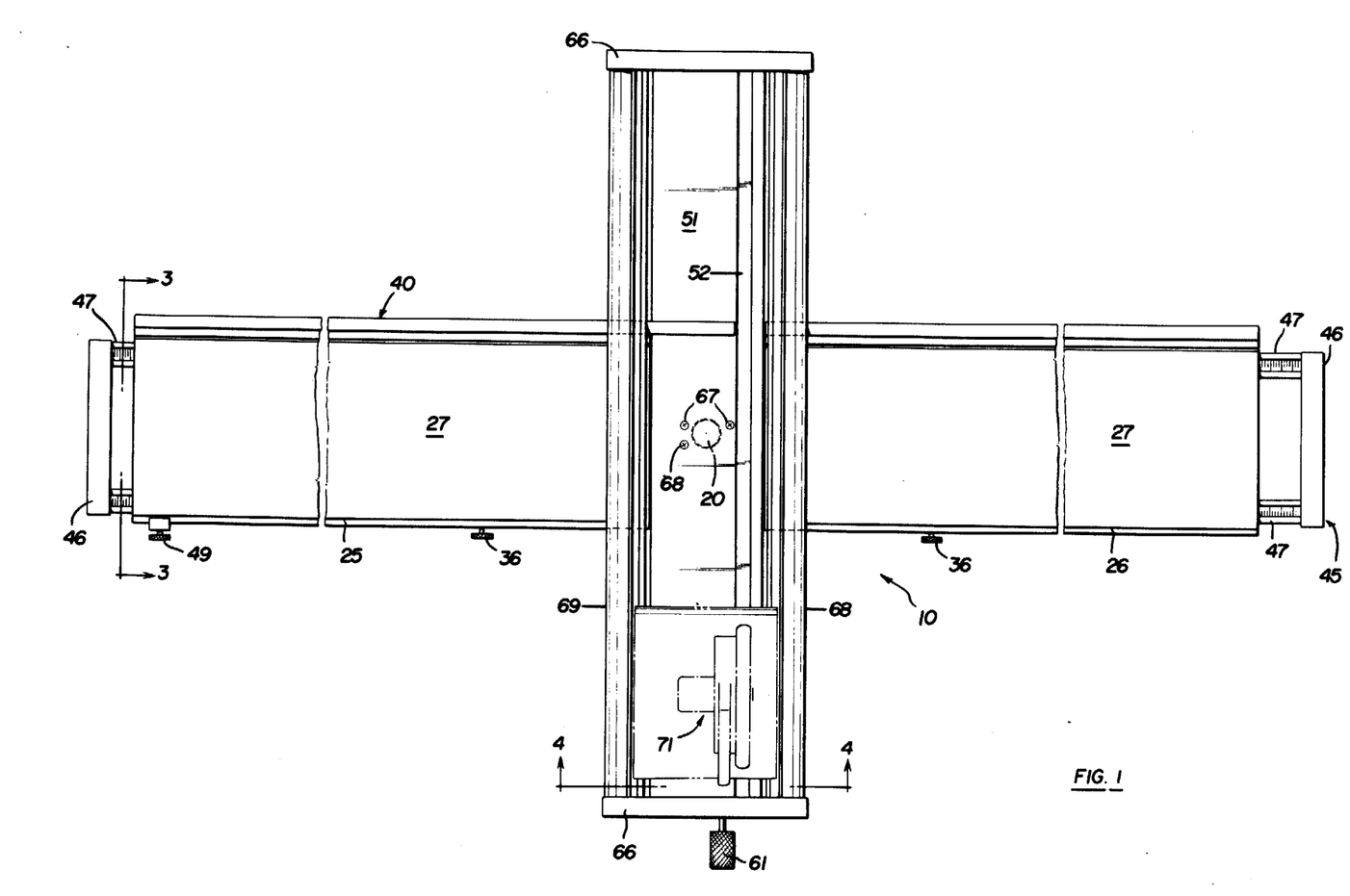
FIG. 1 is a top plan view of the improved portable saw table of the present invention.
Figure 2:
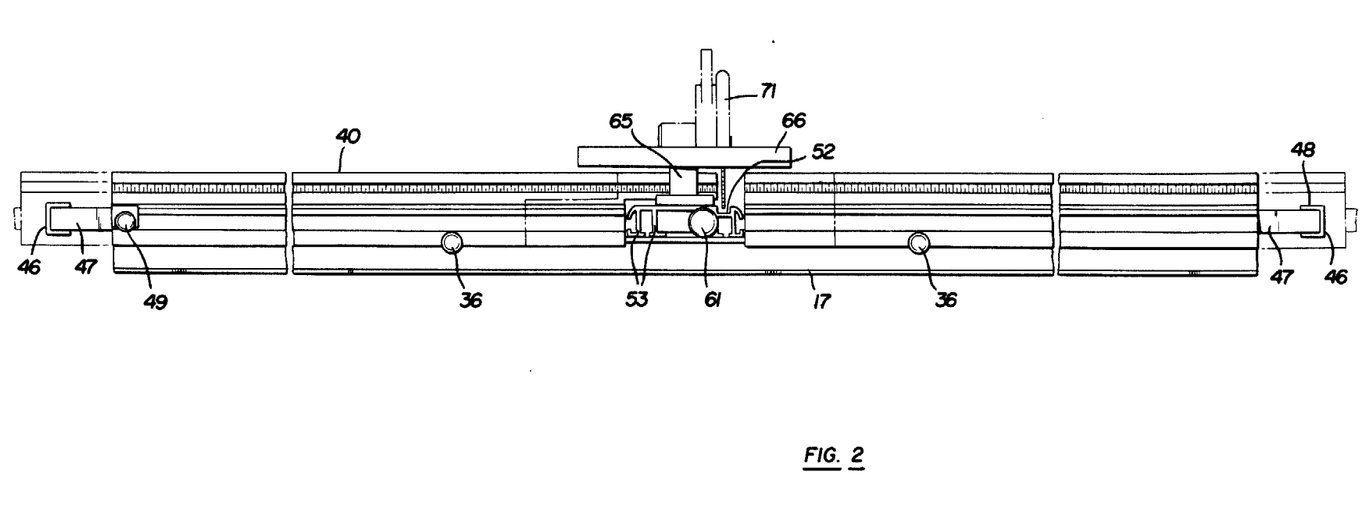
FIG. 2 is a front elevation view of the present invention.

Having thus explained the extendable saw table itself, reference will now be had to the drawings for an explanation of the boom 50 which is pivotally mounted on the boom support element or post 20 to extend generally transversely of the table. As shown in FIGS. 1 and 4, the boom includes an upper work support surface 51 having a recess 52 therein to receive a saw blade. As illustrated in these Figures, the upper support surface 51 of the boom 50 is vertically above the main deck 11 and is substantially coplanar with the upper work supporting surfaces 27 of the upper decks 25 and 26. By virtue of this vertical positioning, there is ample support for the workpiece in the area where the workpiece is being cut, yet the recess 52 prevents the upper surface of the boom from being nicked or marred by the saw during cutting operations.

The boom includes a plurality of downwardly projecting ribs or flanges 53 terminating in lower support surfaces 53a which contact the upper surface 12 of the main deck 11 and thereby support the boom 50 in the correct vertical position.

Means are provided to pivotally mount the boom on the post 20. In a first embodiment, the undersurface of the boom includes a downwardly opening socket 54 having a circular cross-section. The socket is formed of two C-shaped blocks 55, 56 secured to the undersurface of the boom between the inner pair of ribs 53, the blocks being in opposed, spaced-apart relationship with the post 20 interposed therebetween. One of the blocks 55 is rigidly fastened by two screws 57 and the other block 56 pivotally fastened by screw 58.

Means are also provided for releasably retaining the boom on the post. Specifically an elongated screw 59 has its first end threaded into the pivotally mounted block 56 of the socket. The screw is journalled in a suitable aperture in a support block 60 attached to one end of the boom, and the distal end of the screw is fitted with a handle 61.

When the handle and screw are turned, the socket block 56 pivots about screw 58 toward the socket block 55. This causes the socket to circumferentially contract onto the post 20 and thus to frictionally retain the socket on the post.

As illustrated in FIG. 9, the boom may be secured to the post 20 in any one of a plurality of positions 62, 63 and 64 for cutting the workpiece either transversely of its longitudinal axis or at an angle relative to its longitudinal axis.

Figure 5:
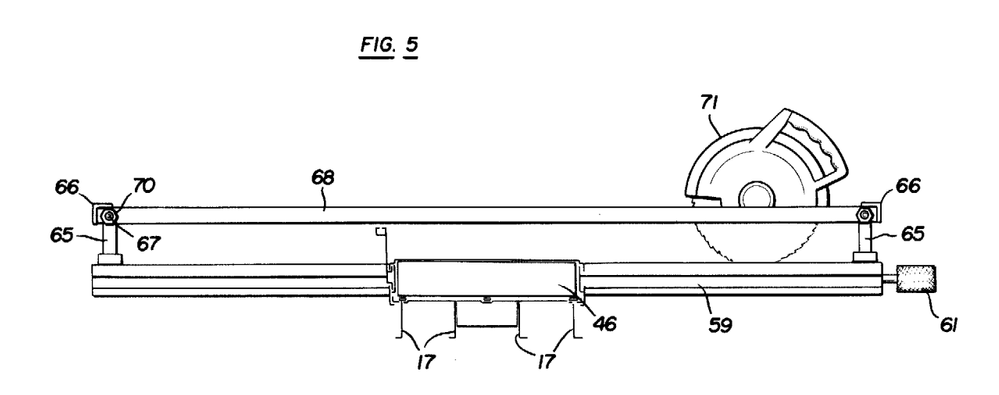
FIG. 5 is a side elevation view of the boom of the present invention.
Figure 6:
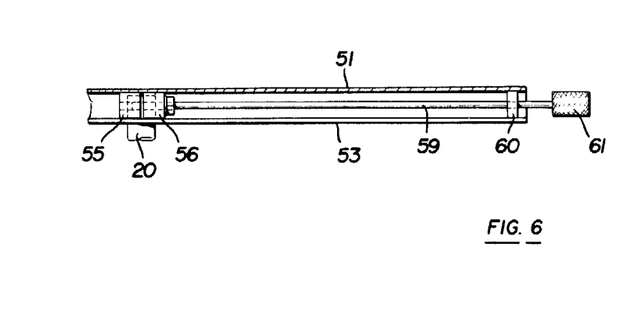
FIG. 6 is an illustration of one embodiment for securing the boom to the saw table.

The boom ends include centrally located vertical guides 65 (FIG. 5) to which cross rails 66 are secured. Elongated screws 67 are carried by the guides 65 and are cantilevered laterally therefrom to carry saw support rails 68 and 69. These rails 68, 69 are transversely slidable on the screws 67 and are positioned by a plurality of adjusting nuts 70. By loosening the appropriate adjusting nuts and moving the rails on the threaded screws, the distance between the support rails 68 and 69 may be adjusted to accommodate saws 71 of different sizes.

Figure 7:
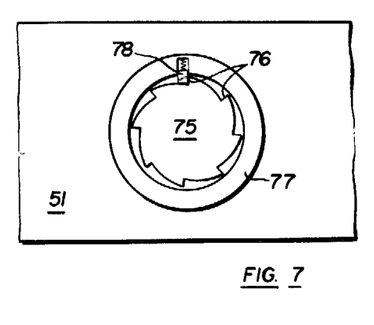
FIG. 7 is an illustration of another embodiment for securing the boom to the saw table of the present invention.

As illustrated in FIG. 7, another embodiment for securing the boom to the post is illustrated with a post 75 having a plurality of splines or grooves 76 positioned to correspond to certain desired cutting angles of the workpiece. A one piece socket 77 has a spring detent 78 mounted on its interior surface. The detent sequentially engages the splines as the boom is rotated on the post to releasably retain the boom in any one of several positions.

The foregoing is a complete explanation of the present invention including the provision of a level support surface for the workpiece along the full length from its extremities through and including a coplanar boom support surface which is recessed to prevent the boom support surface from being nicked by the saw. The boom is removable for convenient storage. The extrusions which form the upper and lower decks are interfitted to provide support along their full length and to facilitate sliding or telescopic motion. The boom is adjustable to accept saws of different widths and may be locked into position as desired.

It should be apparent that various changes and modifications may be made to the present invention without departing from the inventive concept. Therefore, the invention should not be limited to merely the structure described, but only by the scope of the following claims.

What is claimed is:

1. A saw table comprising an elongated main support member having spaced longitudinal support surfaces and a medially located boom support element, a saw-guiding boom pivotally mounted on said support element to extend generally transversely of said main support member at a selected cutting angle, said boom having a work supporting surface, and a pair of support extensions independently telescopically movable longitudinally of said main member along said support surfaces, each extension having an upper work supporting surface, said boom work supporting surface and said extension work supporting surfaces all being substantially co-planar for supporting an article to be cut by a saw guided along said boom at said selected cutting angle.

2. A portable saw table of variable longitudinal working length comprising, in combination:
   an elongated main deck having an upper support surface and a boom support element projecting upwardly from said support surface;
   an elongated top deck telescopically mounted on and supported by said main deck for telescopic movement relative thereto, said top deck having an upper work supporting surface vertically above the support surface of said main deck; and
   a saw-supporting boom pivotally mounted on said support element for angular adjustment relative to said main top decks, said boom having a base contacting the support surface of the main deck and having an upper work supporting surface substantially coplanar with the work support surface of said top deck when said boom base rests on the main deck support surface.

3. The invention as defined in claim 2 and further including:
   a second top deck telescopically mounted on and supported by said main deck for independent telescopic movement relative thereto and having an upper work supporting surface substantially coplanar with the upper work surface of said first top deck.

4. The invention as defined in claim 3 wherein said support element is intermediate the longitudinally inward position of each of said top decks.

5. The invention as defined in claim 2 wherein said support element is a post and said boom includes a downwardly opening socket to receive said post for pivotally mounting said boom thereon.

6. The invention as defined in claim 5 wherein said boom includes means for circumferentially compressing said socket onto the post.

7. The invention as defined in claim 5 wherein said support element is a splined post and said boom includes detent means to releasably hold said boom in a pivoted position on said post.

8. A portable saw table of variable working length for cutting workpieces at variable angles relative to the longitudinal axis of the workpiece comprising:
   a stationary support deck;
   an extension supported on said deck for sliding movement relative to said deck, said extension having a lateral workpiece supporting surface above said support deck;
   a saw supporting boom;
   post and socket means pivotally interconnecting said boom and said support deck;
   said boom having a base adapted to rest on said deck, and a workpiece supporting surface coplanar with the workpiece supporting surface of said extension when said boom base rests on said deck;
   said boom work supporting surface having an elongated groove to receive a saw blade;
   and means for releasably locking said post and socket means, so that the boom is retained at the desired angle relative to the longitudinal axis of said workpiece.

9. The invention as defined in claim 8 wherein said boom securing means circumferentially contracts said socket around said post.

10. The invention as defined in claim 8 wherein said boom securing means releasably engages said socket and said post together.

11. The invention as defined in claim 8 wherein said post is substantially centered on said support deck.

12. The invention as defined in claim 8 and further including a second extension supported on said deck for independent sliding movement relative to said deck, said second extension having a lateral workpiece supporting surface coplanar with the workpiece supporting surface of the other extension.

13. The invention as defined in claim 8 wherein said boom further includes a pair of opposed guide rails mounted vertically above said elongated groove to support and guide a saw, said rails being mounted on said boom in adjustable, spaced-apart parallel position.

14. An extendable portable saw table comprising:
   an elongated main deck having front and rear parallel longitudinal edges, said deck having a vertical pivot post;
   an elongated top deck superimposed on said main deck and having a substantially flat work-supporting surface, said top deck further having longitudinally extending flanges depending from the work-supporting surface and telescopically engaging the parallel longitudinal edges of said main deck, said flanges supporting said work supporting surface above the main deck and above the top of said post; and
   a boom pivotally mounted on said post, said boom having a work supporting surface supported at the level of the work-supporting surface of said top deck by integral flanges contacting said main deck.

15. The invention as defined in claim 14 and further including means to releasably secure together one longitudinal edge of said main deck and one depending flange of said top deck.

16. The invention as defined in claim 14 wherein said boom includes a receptacle for said post and means for releasably securing said receptacle and said post together.

17. The invention as defined in claim 14 and further including a rear guide rail slidably engaging one depending flange of said top deck and extending vertically above the work supporting surface of said top deck.

18. The invention as defined in claim 17 and further including means for releasably clamping together said guide rail and said top deck.

19. The invention as defined in claim 14 wherein said boom further includes parallel spaced apart rails positioned vertically above the boom work supporting surface for supporting and guiding a saw thereabove.

20. The invention as defined in claim 14 wherein said top deck includes a U-shaped extension having its legs engaging said depending flanges of said top deck for telescopic sliding movement relative to the top deck to provide a longitudinal extension for said top deck work supporting surface.

* * * * *